(12) United States Patent
Chen et al.

(10) Patent No.: US 10,477,483 B2
(45) Date of Patent: Nov. 12, 2019

(54) CLOSED LOOP POWER CONTROL FUNCTION BASED ON UPLINK COMMUNICATION TYPE

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/457,804

(22) Filed: Mar. 13, 2017

(65) Prior Publication Data

US 2018/0049135 A1 Feb. 15, 2018

Related U.S. Application Data

(60) Provisional application No. 62/373,763, filed on Aug. 11, 2016.

(51) Int. Cl.
*H04W 52/12* (2009.01)
*H04W 52/08* (2009.01)
(Continued)

(52) U.S. Cl.
CPC ............. *H04W 52/12* (2013.01); *H04L 5/005* (2013.01); *H04W 52/08* (2013.01); *H04W 72/14* (2013.01);
(Continued)

(58) Field of Classification Search
CPC ..... H04W 52/00; H04W 52/04; H04W 52/18; H04W 52/146; H04W 52/08;
(Continued)

(56) References Cited

U.S. PATENT DOCUMENTS 7,907,915 B2    3/2011  Cho et al.
8,422,446 B2    4/2013  Yamada
(Continued)

FOREIGN PATENT DOCUMENTS

WO    WO 2013048570 A1    4/2013

OTHER PUBLICATIONS

ISA/EP, International Search Report and Written Opinion of the International Searching Authority, Int'l Application No. PCT/US2017/044404, dated Oct. 4, 2017, European Patent Office, Rijswijk, NL, 13 pgs.

*Primary Examiner* — Philip Sobutka
(74) *Attorney, Agent, or Firm* — Holland & Hart LLP

(57) ABSTRACT

A user equipment (UE) may identify an upcoming uplink data transmission. The UE may associate the uplink data transmission with a communication type. In some cases, the UE may receive an indication of the communication type in an uplink grant or the UE may determine an identifier for decoding a downlink transmission and further determine the communication type based on the identifier. The UE may then determine and apply a closed-loop power control function, and/or in some cases an open-loop power control function, for the uplink data transmission based on the communication type. In aspects, the UE may receive a semi-static configuration of subframe sets each associated with an additional closed-loop power control function. The UE may then determine a closed-loop power control function for each of the subframe sets based on the communication type associated with each subframe set.

29 Claims, 9 Drawing Sheets

(51) Int. Cl.
*H04W 52/14* (2009.01)
*H04L 5/00* (2006.01)
*H04W 72/14* (2009.01)
*H04M 7/00* (2006.01)
*H04W 52/26* (2009.01)
*H04W 52/28* (2009.01)
*H04W 52/32* (2009.01)

(52) U.S. Cl.
CPC .......... *H04M 7/006* (2013.01); *H04W 52/146* (2013.01); *H04W 52/26* (2013.01); *H04W 52/288* (2013.01); *H04W 52/325* (2013.01)

(58) Field of Classification Search
CPC ... H04W 52/286; H04W 52/06; H04W 52/12; H04W 52/26; H04W 52/288; H04W 52/325; H04W 72/14; H04L 5/005; H04M 7/006
USPC ....................................................... 455/522
See application file for complete search history.

(56) References Cited

U.S. PATENT DOCUMENTS

| | | |
|---|---|---|
| 8,514,794 B2 | 8/2013 | Zhang et al. |
| 2015/0016317 A1 | 1/2015 | Park et al. |
| 2015/0351039 A1* | 12/2015 | Yang .................... H04W 52/04 370/328 |
| 2016/0165545 A1 | 6/2016 | Ouchi et al. |

* cited by examiner

CLOSED LOOP POWER CONTROL FUNCTION BASED ON UPLINK COMMUNICATION TYPE

CROSS REFERENCES

The present Application for Patent claims priority to U.S. Provisional Patent Application No. 62/373,763 by CHEN, et al., entitled "INNER LOOP POWER CONTROL," filed Aug. 11, 2016, assigned to the assignee hereof.

BACKGROUND

The following relates generally to wireless communication, and more specifically to improved inner loop power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communications systems may support multiple services associated with different operational needs. For example, two services may be supported that allow for different operational set points such as a link quality level (e.g., over-the-air block error rates (BLER)). However, in some cases, despite the two services having different acceptable operational set points, the wireless communications systems may still apply a same operation level to both services. For example, power control (e.g., closed-loop power control functions, open-loop power control parameters, etc.) that is indifferent to different over-the-air BLER operation points may result in inefficient power usage and may degrade system performance. Enhancements in closed-loop power control operation may result in improved system performance in such scenarios.

SUMMARY

The described techniques relate to improved methods, systems, devices, or apparatuses that support improved inner loop power control. A user equipment (UE) may identify an upcoming uplink data transmission. The UE may associate the uplink data transmission with a communication type. In some cases, the UE may receive an indication of the communication type in an uplink grant or the UE may determine an identifier for decoding a downlink transmission and further determine the communication type based on the identifier. The UE may then determine and apply a closed-loop power control function, and in some cases an open-loop power control function, for the uplink data transmission based on the communication type. Further, the UE may receive a semi-static configuration of subframe sets each associated with an additional closed-loop power control function. The UE may then determine a closed-loop power control function for each of the subframe sets based on the communication type associated with each subframe set. Numerous other aspects are provided.

A method of wireless communication is described. The method may include identifying that an uplink data transmission is to occur, associating the uplink data transmission with a communication type, determining, from a plurality of configured closed-loop power control functions and based on the communication type, a closed-loop power control function to use for the uplink data transmission, and applying the closed-loop power control function to the uplink data transmission.

An apparatus for wireless communication is described. The apparatus may include means for identifying that an uplink data transmission is to occur, means for associating the uplink data transmission with a communication type, means for determining, from a plurality of configured closed-loop power control functions and based on the communication type, a closed-loop power control function to use for the uplink data transmission, and means for applying the closed-loop power control function to the uplink data transmission.

Another apparatus for wireless communication is described. The apparatus may include a processor, memory in electronic communication with the processor, and instructions stored in the memory. The instructions may be operable to cause the processor to identify that an uplink data transmission is to occur, associate the uplink data transmission with a communication type, determine, from a plurality of configured closed-loop power control functions and based on the communication type, a closed-loop power control function to use for the uplink data transmission, and apply the closed-loop power control function to the uplink data transmission.

A non-transitory computer readable medium for wireless communication is described. The non-transitory computer-readable medium may include instructions operable to cause a processor to identify that an uplink data transmission is to occur, associate the uplink data transmission with a communication type, determine, from a plurality of configured closed-loop power control functions and based on the communication type, a closed-loop power control function to use for the uplink data transmission, and apply the closed-loop power control function to the uplink data transmission.

In some examples of the method, apparatus, and non-transitory computer-readable medium described above, associating the uplink data transmission with a communication type comprises: receiving an indicator of the communication type in an uplink grant.

In some examples of the method, apparatus, and non-transitory computer-readable medium described above, associating the uplink data transmission with a communication type comprises: receiving a downlink transmission. Some examples of the method, apparatus, and non-transitory computer-readable medium described above may further include processes, features, means, or instructions for determining an identifier for decoding the downlink transmission. Some examples of the method, apparatus, and non-transitory computer-readable medium described above may further include processes, features, means, or instructions for determining the communication type based on the identifier.

In some examples of the method, apparatus, and non-transitory computer-readable medium described above, determining the closed-loop power control function to use comprises: determining the closed-loop power control function on a per uplink transmission basis.

Some examples of the method, apparatus, and non-transitory computer-readable medium described above may further include processes, features, means, or instructions for determining, based on the communication type, an open-loop power control function to use for the uplink data transmission.

Some examples of the method, apparatus, and non-transitory computer-readable medium described above may further include processes, features, means, or instructions for receiving an indication of whether to determine closed-loop power control functions based on communication type.

Some examples of the method, apparatus, and non-transitory computer-readable medium described above may further include processes, features, means, or instructions for disabling determination of closed-loop power control functions based on the indication.

In some examples of the method, apparatus, and non-transitory computer-readable medium described above, the indication may be at least one of a UE-specific indication or a one or more subcarrier-wide indication.

Some examples of the method, apparatus, and non-transitory computer-readable medium described above may further include processes, features, means, or instructions for receiving a semi-static configuration of at least two subframe sets, each subframe set being associated with an additional closed-loop power control function. Some examples of the method, apparatus, and non-transitory computer-readable medium described above may further include processes, features, means, or instructions for determining, for at least one of the subframe sets, a first closed-loop power control function to use for the uplink data transmission for a first communication type in a first uplink subframe of the at least one subframe set. Some examples of the method, apparatus, and non-transitory computer-readable medium described above may further include processes, features, means, or instructions for determining a second closed-loop power control function to use for the uplink data transmission for a second communication type in a second uplink subframe in the at least one subframe set.

In some examples of the method, apparatus, and non-transitory computer-readable medium described above, each of the two or more subframe sets may be associated with a respective interference characteristic.

Some examples of the method, apparatus, and non-transitory computer-readable medium described above may further include processes, features, means, or instructions for applying power control to an additional uplink transmission based at least in part on the closed-loop power control function applied to the uplink data transmission.

In some examples of the method, apparatus, and non-transitory computer-readable medium described above, the uplink data transmission may be a semi-persistent scheduling (SPS) transmission and the additional uplink transmission may be a sounding reference signal (SRS) transmission.

Some examples of the method, apparatus, and non-transitory computer-readable medium described above may further include processes, features, means, or instructions for applying power control to an additional uplink transmission in an uplink subframe based at least in part on a reference closed-loop power control function regardless of whether the reference closed-loop power control function may be applied to the uplink data transmission in the uplink subframe.

In some examples of the method, apparatus, and non-transitory computer-readable medium described above, the communication type may be one of a SPS communication type or a non-SPS communication type.

In some examples of the method, apparatus, and non-transitory computer-readable medium described above, associating the uplink data transmission with a communication type comprises: determining an identifier for decoding a downlink transmission, wherein the identifier may be one of a cell radio network temporary identifier (C-RNTI) or a semi-persistent scheduling cell radio network temporary identifier (SPS C-RNTI). Some examples of the method, apparatus, and non-transitory computer-readable medium described above may further include processes, features, means, or instructions for determining the communication type based on the identifier.

In some examples of the method, apparatus, and non-transitory computer-readable medium described above, the communication type may be associated with a link quality level.

In some examples of the method, apparatus, and non-transitory computer-readable medium described above, the uplink data transmission may be a voice over interne protocol (VoIP) transmission.

DETAILED DESCRIPTION

Wireless communications systems may support multiple services (e.g., communication types) associated with different operational needs. For example, two services may be supported that allow for different over-the-air block error rates (BLERs). Uplink power control may include closed-loop power control functions (e.g., inner loop power control) that take the operational needs of communication types into account for improved power consumption. For example, a user equipment (UE) may be capable of supporting multiple closed-loop power control functions for data transmissions associated with different communication types. Additionally or alternatively, a UE may receive a semi-static configuration for sets of subframes associated with different closed-loop power control functions. Thus, a UE may support multiple closed-loop power control functions based on operational needs and/or subframe sets associated with different communication types. Closed-loop power control functions may be explicitly (e.g., via an indication) or implicitly (e.g., via decoding a downlink transmission) differentiated by the UE. In some cases, closed-loop power control functions described herein may be combined with open-loop differentiation parameters.

As an example, a UE may identify a communication type of an upcoming transmission as, or associated with, either a semi-persistent scheduling (SPS) transmission or a non-SPS transmission. The UE may determine which inner loop (e.g., closed-loop power control) is to be used for the upcoming transmission. The determination of which inner loop to use may be based on the operational needs (e.g., BLER operation point) of the identified communication type. For example, an SPS transmission may be associated with a VoIP service supporting a BLER higher than other types of traffic, and may benefit from utilization of a different inner loop power control (e.g., a different inner loop power control than an inner loop power control used for the other types of traffic). Associating different inner loops with different communication types may enable the UE to implement efficient power control on a per transmission basis. UEs configured with a plurality of inner loops may thus result in more efficient power consumption.

Aspects of the disclosure are initially described in the context of a wireless communications system. Examples of wireless systems supporting improved inner loop power control in addition to example process flows are then described. Aspects of the disclosure are further illustrated by and described with reference to apparatus diagrams, system diagrams, and flowcharts that relate to power control for improved inner loop power control.

Figure 1:
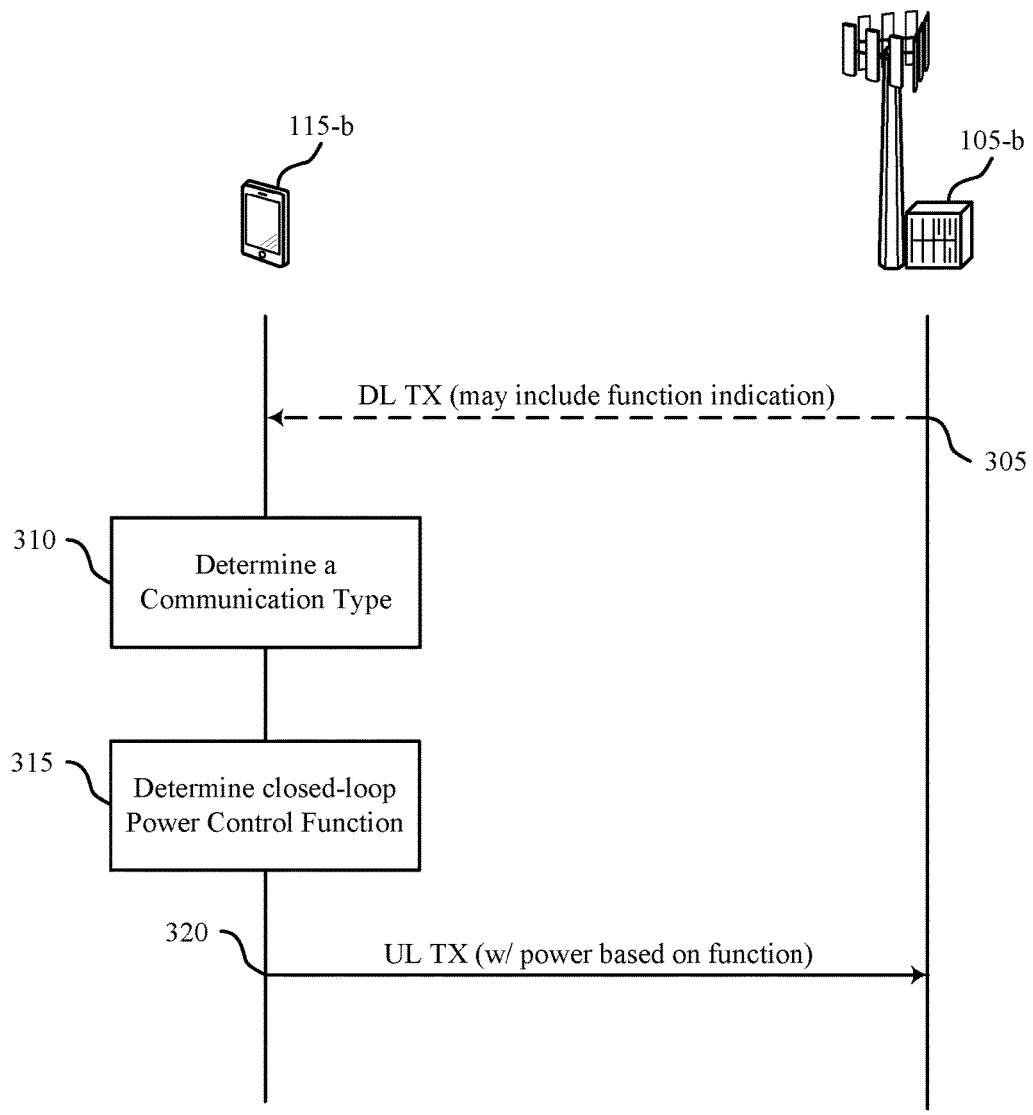
FIG. 1 illustrates an example of a system for wireless communication that supports improved inner loop power control in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) or LTE-Advanced (LTE-A) network.

Base stations 105 may wirelessly communicate with UEs 115 (e.g., using various RATs or wireless technologies) via one or more base station antennas. Each base station 105 may provide communication coverage for a respective geographic coverage area 110. Each base station 105 may provide communication coverage for a macro cell, a small cell, or other types of cell. The term "cell" is a 3rd Generation Partnership Project "3GPP" term that can be used to describe a base station, a carrier or component carrier associated with a base station, or a coverage area (e.g., sector, etc.) of a carrier or base station, depending on context. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, wireless communication UE apparatus, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. A base station 105 may also be referred to as an access point (AP), a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for one or more multiple communication devices, which may be otherwise known as a UE.

Physical resources for downlink data transmissions may be assigned or scheduled using downlink control information. Such information may include control signaling messages including, for example, downlink resource assignments data transmissions over a physical downlink shared channel (PDSCH) and uplink transmission grants for the physical uplink shared channel (PUSCH). A physical uplink control channel (PUCCH) may be used for uplink acknowledgements (ACKs), scheduling requests (SRs) and channel quality information (CQI) and other uplink control information. PDSCH may be the main downlink data-bearing channel in LTE. A PUSCH may be the LTE uplink physical channel carrying scheduled data traffic, and control signaling if some is required to be transmitted in the same subframe.

Hybrid automatic repeat request (HARQ) may be an error detection and correction scheme that may be employed in wireless communications system 100. HARQ ACK/negative acknowledgement (NACK or NAK) information is the information a receiver feeds back to the transmitter in order to acknowledge the correct reception of a packet or ask for a new retransmission. The chain of transmission, response and retransmission may be referred to as a HARQ process. HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. The chain of transmission, response and retransmission may be referred to as a HARQ process. In some cases, a limited number of HARQ processes may be used for a given communication link 125.

BLER may, for example, refer to a measure of received signal quality: the proportion of received data blocks which is decoded erroneously. Usually this refers to trans-port blocks, and the errors are detected by CRC failure. CRC may refer to an error detecting code appended to a block of data to be transmitted. The value of the CRC is calculated only from the block of data itself. The length of the CRC determines the number of errors which can be detected in the block of data on reception. A CRC may not be able to correct errors or determine which bits are erroneous.

In some cases, wireless communications system 100 (e.g., LTE networks) may be designed for transfer of data packets, and may use a circuit switched fall back for voice communications. However, an LTE network may also be used for voice communications using a packet based system similar to voice over internet protocol (VoIP) applications such as Skype. This may be accomplished using Voice over LTE (VoLTE) technology. VoIP may refer to transmission of packetized voice communications using internet protocol (IP). VoIP is a thus a packet-switched technology. To provide quality of service, VoIP may operate under a link level operation point of a percentage over-the-air BLER (e.g., 1% BLER) subject to a certain delay budget. However, advances in VoIP upper layer technology may result in higher BLER operations (e.g., 6% BLER) without voice quality compromise. That is, modern VoIP operation may be more tolerant of drops over the air.

SPS may enable radio resources to be semi-statically configured and allocated to a UE 115 for a longer time period than one subframe, avoiding the need for specific downlink assignment messages or uplink grant messages over the physical downlink control channel (PDCCH) for each subframe. SPS is useful for services where the timing and amount of radio resources needed are predictable, such as VoIP, thus reducing the overhead of the PDCCH compared to dynamic scheduling. Wireless communications system 100 (e.g., LTE communication systems) may support SPS to more effectively support VoIP with this reduced control overhead. In comparison, other types of traffic may be scheduled with a control channel, and dynamically scheduled for both initial transmissions and retransmissions. With SPS, initial transmissions may be based on configured transmissions without a companion control channel, while HARQ retransmissions may still be accompanied by the corresponding control channels.

A cell-radio network temporary identifier (C-RNTI) may refer to a UE identifier that is unique within one cell, controlled and allocated by a base station 105. The C-RNTI may be reallocated when a UE 115 moves to a new cell. A semi-persistent scheduling cell-radio network temporary identifier (SPS C-RNTI) may refer to an identifier of the scheduling messages transmitted on the PDCCH for semi-persistently scheduled PDSCH data transmissions. The SPS C-RNTI may allow the UE to differentiate these messages from those used for dynamic scheduling messages identified by C-RNTI and may be transmitted as a scrambling code applied to the CRC of the PDSCH transmission. That is, each SPS transmission (e.g., initial transmission and/or retransmission) may be associated with an SPS C-RNTI distinct from the regular C-RNTI. The PDSCH may be scrambled by SPS C-RNTI, and the control channel (e.g., PDCCH) CRC may be masked by SPS C-RNTI for retransmissions.

A UE 115 may coordinate transmit power with a serving base station to mitigate interference, improve the UL data rate, and prolong battery life. Uplink power control may include open-loop and/or closed-loop mechanisms. Closed-loop and inner loop may be used synonymously and may differentiate from open-loop as follows. In open-loop power control the UE transmit power depends on estimates of the downlink path-loss and channel configuration. In closed-loop power control, the network may directly control the UE transmit power using explicit power-control commands. Open-loop power control may be used for initial access, whereas both open-loop and closed-loop power control may be used for UL control and data transmission. A UE 115 may determine power using an algorithm that takes into account a maximum transmission power limit, a target base station receive power, path loss, modulation and coding scheme (MCS), the number of resources used for transmission, and the format of the transmitted data (e.g., PUCCH format). In aspects, for closed-loop operation, a base station 105 may look at a set point (e.g., based on a BLER operation point) and issue power adjustments accordingly. Power adjustments may be made by a base station 105 using a transmit power command (TPC) messages, which may incrementally adjust the transmit power of a UE 115 as appropriate.

SPS traffic and dynamically scheduled traffic may have different initial HARQ BLER operation points. For example, after a first HARQ transmission, dynamically scheduled UL traffic may operate at 10% BLER while SPS traffic may operate above 10% BLER. However, both types of traffic may still operate at similar over-the-air BLER (e.g., 1% BLER) after retransmissions. Thus, different open power control parameters for SPS traffic and dynamic traffic may be supported. Two sets of parameters (e.g., cell-specific) $P_{O\_Nominal\_PUSCH}(j)$ and UE-specific $P_{O\_UE\_PUSCH}(j)$ may address PUSCH initial and retransmission needs corresponding to SPS and dynamically scheduled traffic (e.g., j=0 and j=1 respectively). However, such open-loop parameters may not address different over-the-air BLER operation points after HARQ re-transmissions (e.g., target BLER associated with advances in VoIP technology). Closed-loop power control (e.g., inner loop power control) may be managed by a function $f(i)$, where i is the subframe index, that is irrespective of different over-the-air BLER operation points. That is, even if two or more power control loops (e.g., $f1(i)$ and $f2(i)$) are supported, there may be no connection with different over-the-air BLER operation points.

Figure 2:
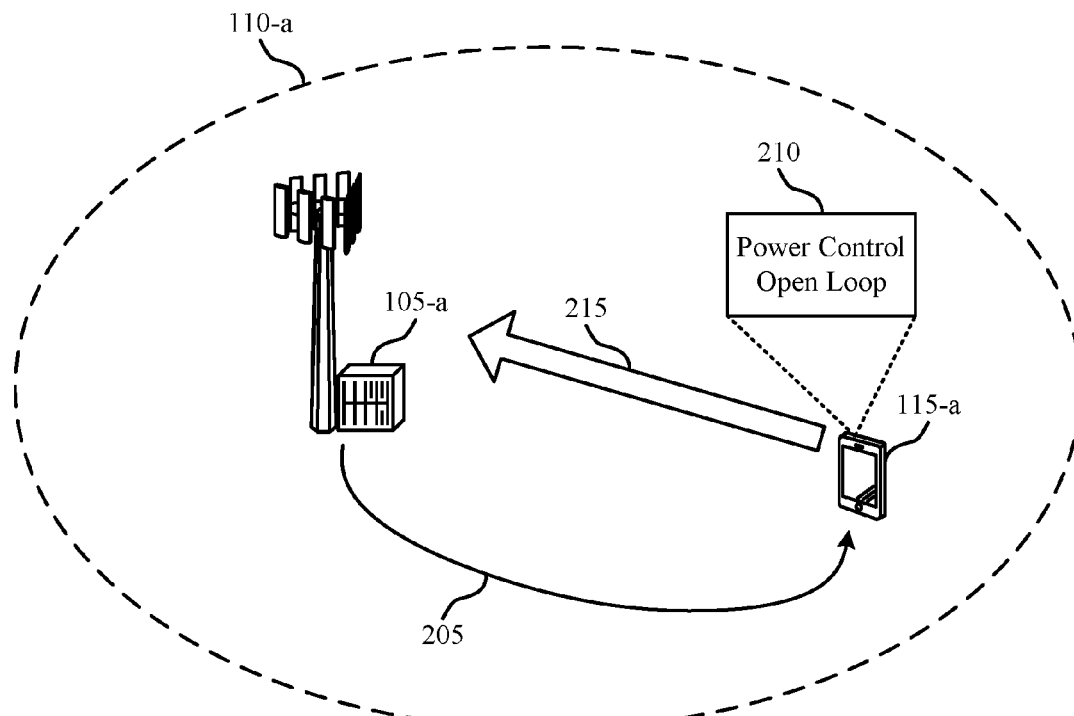
FIG. 2 illustrates an example of a wireless communications system that supports improved inner loop power control in accordance with aspects of the present disclosure.

FIG. 2 illustrates an example of a wireless communications system 200 for improved inner loop power control. Wireless communications system 200 may support multiple services (e.g., communication types) associated with different operational needs. For example, SPS communication and non-SPS communication may be supported and allow for different over-the-air BLERs. Uplink power control may include closed-loop power control functions (e.g., utilizing a combination of inner loops 205 and/or open-loops 210) that take the operational needs of communication types (e.g., of UL transmissions 215, or how the UE 115-*a* is scheduled) into account for improved power consumption. For example, a UE 115-*a* may be capable of supporting closed-loop power control functions for data transmissions associated with different communication types (e.g., utilizing multiple inner loops 205). Additionally or alternatively, UE 115-*a* may receive a semi-static configuration for sets of subframes associated with different inner loops. Thus, UE 115-*a* may support closed-loop power control functions based on operational needs and/or subframe sets associated with different communication types. Inner loops 205 used for power control may be explicitly (e.g., via an indication) or implicitly (e.g., via decoding a downlink transmission) differentiated by the UE 115-*a*. In some cases, UE 115-*a* may support closed-loop power control functions utilizing both inner loops 205 and open-loops 210. Such functions may dynamically control UE 115-*a* transmission power based on the communication type associated with an UL transmission 215.

UE 115-*a* may be configured with two or more power control inner or closed loops (e.g., inner loops 205) associated with different operational needs. Base station 105-*a* may manage two or more power control inner loops 205 associated with different operation set points. For example, wireless communications system 200 may support a 1% BLER operation point inner loop 205 associated with regular traffic and a 5-6% BLER operation point inner loop 205 (e.g., closed-loop) associated with enhanced VoIP traffic. That is, in the present example, base station 105-*a* may manage two UL set points and configure two inner loops 205 separately to achieve different BLERs over the air. For example, multiple configured inner loops may reduce interference from excess power in VoIP calls while maintaining existing power control for data transmissions.

Operation of multiple power control inner loops 205 may be differentiated implicitly or explicitly. For example, C-RNTI and SPS C-RNTI of a transmission may be used for implicit differentiation. Looking at whether C-RNTI or SPS C-RNTI should be used for a particular uplink subframe transmission, UE 115-*a* may determine which power control inner loop 205 should be used for power control of the corresponding transmission. Additionally or alternatively, an explicit indication of which power control loop should be used may be included in an UL grant (e.g., from base station 105-*a*) to UE 115-*a*.

Association of inner loop power control with a particular transmission may be dynamic depending on how transmissions are scheduled at base station 105-*a*. For example, in a particular UL transmission instance, UE 115-*a* may determine the association of the scheduled uplink data transmission (e.g., SPS or non-SPS). The determined association may then be used to determine which power control inner loop is used. For example, for SPS PUSCH, $f1(i)$ is used, for non-SPS PUSCH, $f2(i)$ is used. UE 115-*a* may then compute power for the corresponding transmission based on the determined power control inner loop.

In some cases, different open-loop power control parameters may also be used for different communication types. Thus, power control inner loop differentiation may be combined with open-loop power control differentiation (e.g., UE 115-*a* may differentiate between inner loops 205 and open-loops 210). For example, to compute PUSCH transmit power, $f1(i)$ may be used along with $P_{O\_Nominal\_PUSCH}(0)$ and UE-specific $P_{O\_UE\_PUSCH}(0)$ for SPS PUSCH and $f2(i)$ may be used along with $P_{O\_Nominal\_PUSCH}(1)$ and UE-specific $P_{O\_UE\_PUSCH}(1)$ for non-SPS PUSCH. This feature may be enabled and/or disabled on a per UE and/or per carrier basis (e.g., power control may be determined based on different services or communication types on each carrier).

In addition to operational-need advantages (e.g., flexible BLER operation), there may be interference or subframe based advantages to multiple power control inner loop operation. Multiple subframe-set dependent power control inner loops 205 may be utilized for different UL subframes in a particular cell (e.g., for different interference characteristics in different subframe sets). Operational-need based power control inner loops 205 and subframe-set based power control inner loops 205 may be combined or operated jointly. For example, two power control inner loops, $f\{1,1\}(i)$ for SPS and $f\{1,2\}(i)$ for non-SPS, may be used for a first subframe set and two power control inner loops, $f\{2,1\}(i)$ for SPS and $f\{2,2\}(i)$ for non-SPS may be used for a second subframe set. As another example, two power control inner loops, $f\{1,1\}(i)$ for SPS and $f\{1,2\}(i)$ for non-SPS, may be used for a first subframe set and a single power control inner loop $f\{2\}(i)$, where only non-SPS traffic is intended for scheduling, may be used for a second subframe set. Different subframe sets may thus be associated with different types of channels (e.g., PUSCH). The power control for a subframe set may be determined (e.g., selected) based on an identified PUSCH channel type.

Additional UL channels may use power control dependent on PUSCH power control. Power control may be determined based on the communication type of PUSCH (e.g., the PUSCH channel type). PUSCH channel type may be determined based on whether the PUSCH corresponds to an SPS grant of UL resources, DCI, a dynamic grant, etc. For example, sounding reference signal (SRS) power control may depend on a PUSCH power control inner loop and may be further adjusted (e.g., based on power offsets, bandwidth difference between SRS and PUSCH transmissions, etc.). In the case of two or more power control inner loops due to operation needs for UL traffic, SRS power control may use one of the two or more power control inner loops as a reference power control loop. For example, PUSCH may have $f1(i)$ for SPS, and $f2(i)$ for non-SPS, but SRS power control may be only based on $f2(i)$ regardless of whether SRS is transmitted in a same subframe as SPS PUSCH, in a same subframe as non-SPS PUSCH, or in a separate subframe form PUSCH.

Figure 3:
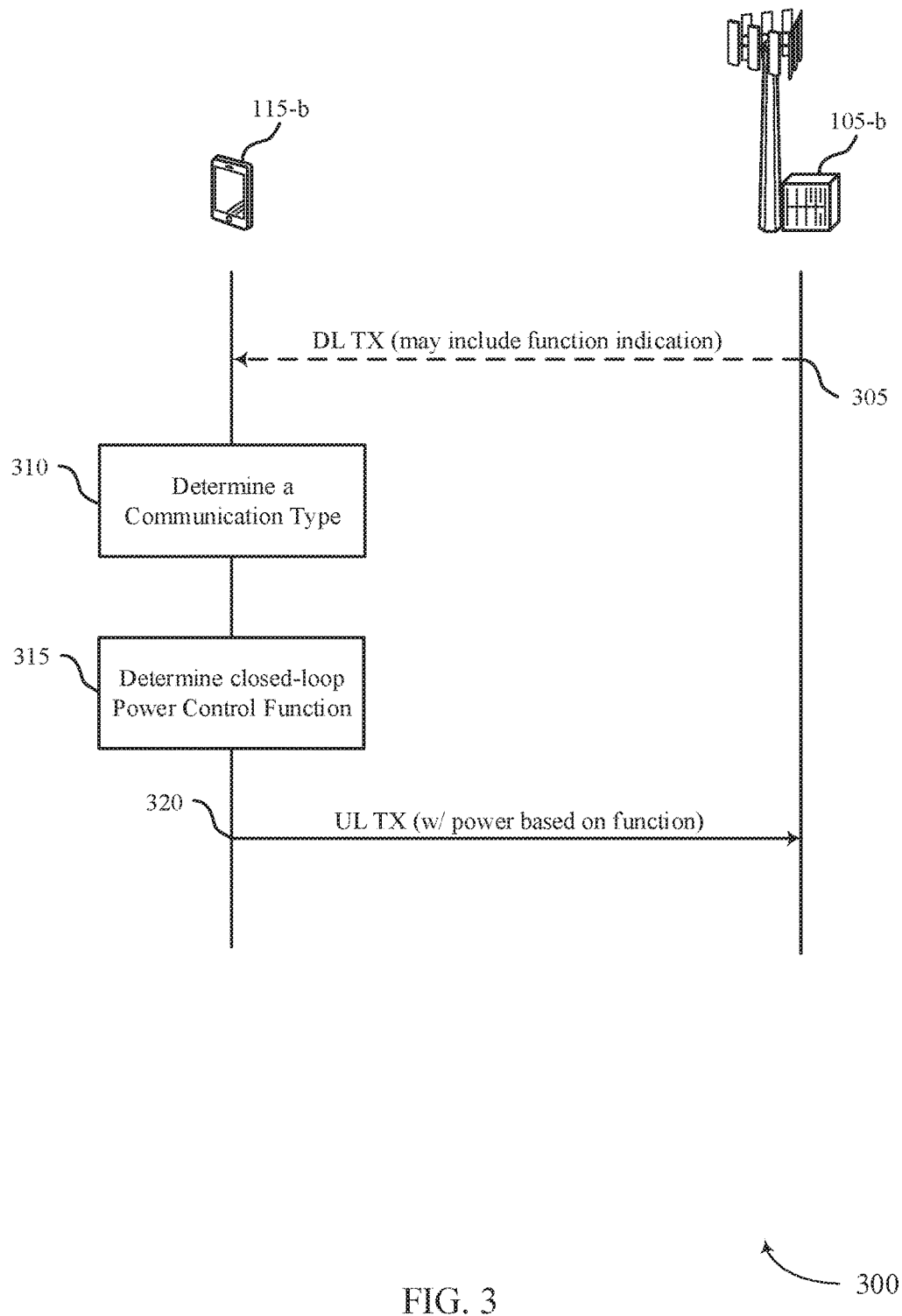
FIG. 3 illustrates an example of a process flow that supports improved inner loop power control in accordance with aspects of the present disclosure.

FIG. 3 illustrates an example of a process flow 300 for improved inner loop power control.

At step 305, base station 105-*b* may, in some cases, send a downlink transmission to UE 115-*b*. The downlink transmission may be an uplink grant that includes an indication of a communication type associated with an upcoming uplink transmission. The indication may be a UE-specific or subcarrier-specific indication. The indication may include whether UE 115-*b* should determine closed-loop power control functions based on communication type. For example, in some cases the indication may disable closed-loop power control function determination at UE 115-*b*. Additionally or alternatively, base station 105-*b* may send a semi-static configuration for one or more subframe sets at step 305. In some cases, the one or more subframe sets may be differentiated by their associated interference characteristics.

At step 310, UE 115-*b* may associate the uplink data transmission (e.g., indicated in step 305) with a communication type. In some cases, the association may result directly from receiving a communication type indication in an uplink grant or may be based on how the UE 115-*b* is scheduled. In other cases, UE 115-*b* may determine an identifier for decoding the downlink data transmission sent at step 305, and determine a communication type based on the identifier. For example, the identifier may include a C-RNTI or a SPS C-RNTI. Further, the determined communication type may include, for example, a SPS or non-SPS communication type. The communication type may be associated with a link quality level.

At step 315, UE 115-*b* may determine a closed-loop power control function for use for the upcoming uplink data transmission. The closed-loop power control function may be determined based on the communication type identified at step 310. The closed-loop power control function may be determined per uplink transmission. Alternatively, an open-loop power control function may be determined for the uplink data transmission based on the communication type. Additionally or alternatively, UE 115-*b* may determine multiple closed-loop power control functions for sets of subframes if a semi-static configuration for subframe sets was received at step 305. The multiple closed-loop power control functions may be determined based on the communication type associated with each set of subframes.

At step 320, UE 115-*b* may apply the closed-loop power control function to an uplink transmission, and transmit to base station 105-*b*. In some cases, the closed-loop power control function may be applied to an additional uplink transmission. For example, the original uplink transmission may be a SPS transmission and the additional transmission may be a SRS transmission. UE 115-*b* may apply the closed-loop power function to an additional uplink transmission in an uplink subframe regardless of whether the reference closed-loop power control function is applied to the uplink data transmission in the uplink subframe. In some cases, the uplink transmission may be a VoIP transmission.

Figure 4:
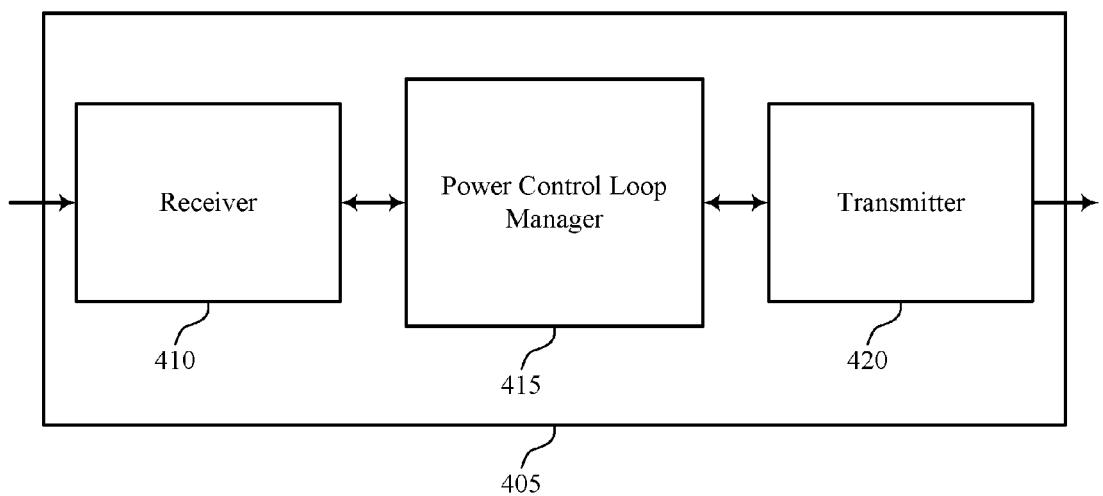
FIGS. 4 through 6 show block diagrams of a device that supports improved inner loop power control in accordance with aspects of the present disclosure.

FIG. 4 shows a block diagram 400 of a wireless device 405 that supports improved inner loop power control in accordance with various aspects of the present disclosure. Wireless device 405 may be an example of aspects of a UE 115 as described with reference to FIG. 1. Wireless device 405 may include receiver 410, power control loop manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to improved inner loop power control, etc.). Information may be passed on to other components of the device. The receiver 410 may be an example of aspects of the transceiver 735 described with reference to FIG. 7.

Power control loop manager 415 may be an example of aspects of the power control loop manager 715 described with reference to FIG. 7. Power control loop manager 415 may identify that an uplink data transmission is to occur and associate the uplink data transmission with a communication type. The power control loop manager 415 may then determine, from a plurality of configured closed-loop power control functions and based on the communication type, a closed-loop power control function to use for the uplink data transmission, and apply the closed-loop power control function to the uplink data transmission.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
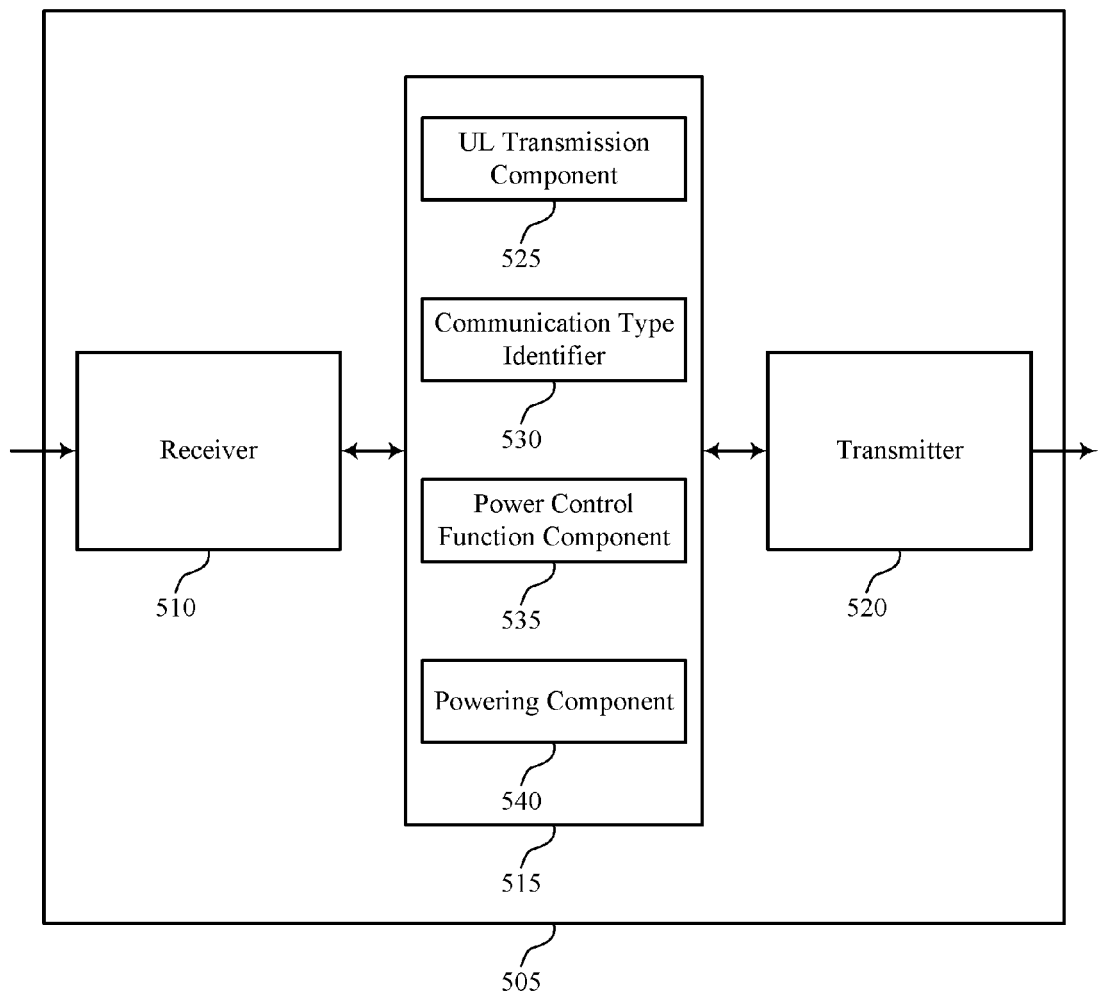

FIG. 5 shows a block diagram 500 of a wireless device 505 that supports improved inner loop power control in accordance with various aspects of the present disclosure. Wireless device 505 may be an example of aspects of a wireless device 405 or a UE 115 as described with reference to FIGS. 1 and 4. Wireless device 505 may include receiver 510, power control loop manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to improved inner loop power control, etc.). Information may be passed on to other components of the device. The receiver 510 may be an example of aspects of the transceiver 735 described with reference to FIG. 7.

Power control loop manager 515 may be an example of aspects of the power control loop manager 715 described with reference to FIG. 7. Power control loop manager 515 may also include UL transmission component 525, communication type identifier 530, power control function component 535, and powering component 540.

UL transmission component 525 may identify that an uplink data transmission is to occur. In some cases, the uplink data transmission is a VoIP transmission.

Communication type identifier 530 may associate the uplink data transmission with a communication type, determine an identifier for decoding the downlink transmission, and determine the communication type based on the identifier. In some cases, associating the uplink data transmission with a communication type includes receiving an indicator of the communication type in an uplink grant. In some cases, associating the uplink data transmission with a communication type includes receiving a downlink transmission and associating the downlink transmission with a communication type based on how the downlink transmission is received. In some cases, the communication type is one of a SPS communication type or a non-SPS communication type. In some cases, the communication type is associated with a link quality level.

Power control function component 535 may determine, from a plurality of configured closed-loop power control functions and based on the communication type, a closed-loop power control function to use for the uplink data transmission. Power control function component 535 may then determine, for at least one of the subframe sets, a first closed-loop power control function to use for the uplink data transmission for a first communication type in a first uplink subframe of the at least one subframe set. Power control function component 535 may then determine a second closed-loop power control function to use for the uplink data transmission for a second communication type in a second uplink subframe in the at least one subframe set. In some cases, determining the closed-loop power control function to use includes determining the closed-loop power control function on a per uplink transmission basis.

Powering component 540 may apply the closed-loop power control function to the uplink data transmission, apply power control to an additional uplink transmission based on the closed-loop power control function applied to the uplink data transmission, and apply power control to an additional uplink transmission in an uplink subframe based on a reference closed-loop power control function regardless of whether the reference closed-loop power control function is applied to the uplink data transmission in the uplink subframe. In some cases, the uplink data transmission is a SPS transmission and the additional uplink transmission is a SRS transmission.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
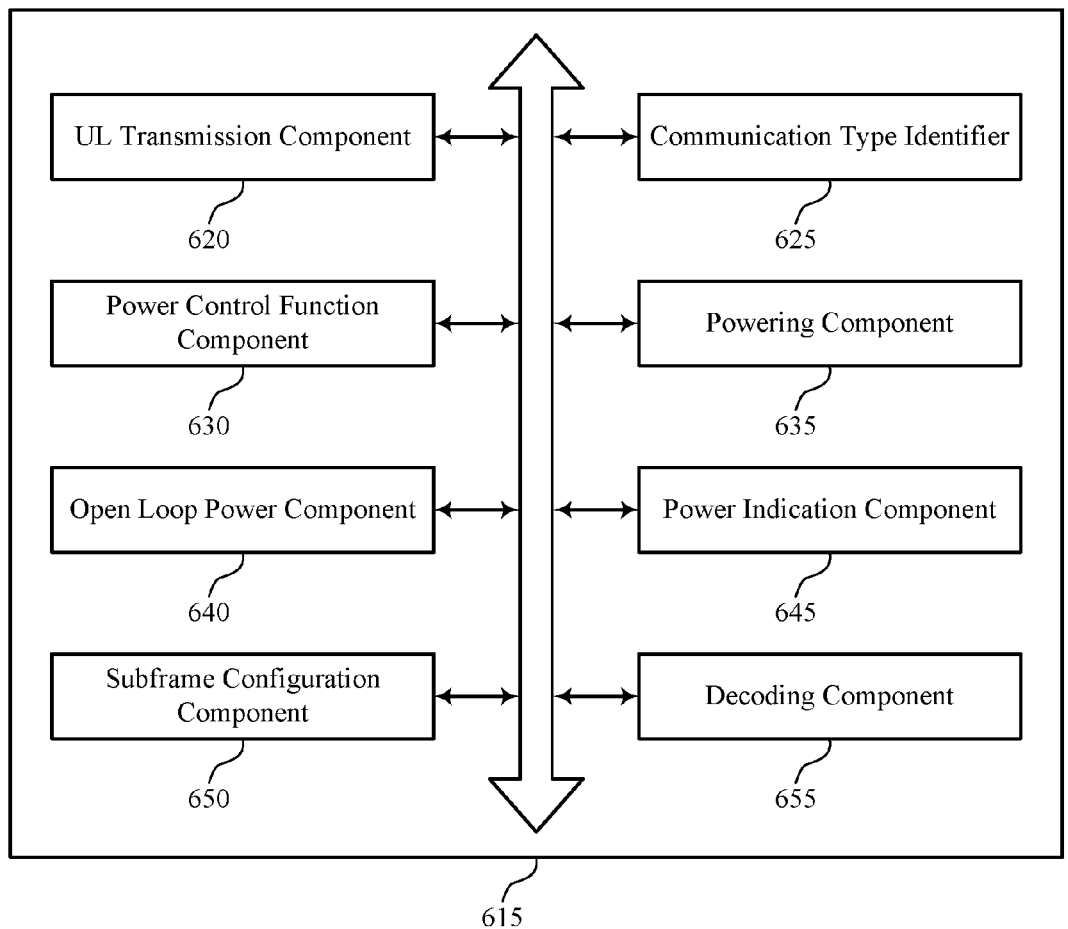

FIG. 6 shows a block diagram 600 of a power control loop manager 615 that supports improved inner loop power control in accordance with various aspects of the present disclosure. The power control loop manager 615 may be an example of aspects of a power control loop manager 415, a power control loop manager 515, or a power control loop manager 715 described with reference to FIGS. 4, 5, and 7. The power control loop manager 615 may include UL transmission component 620, communication type identifier 625, power control function component 630, powering component 635, open loop power component 640, power indication component 645, subframe configuration component 650, and decoding component 655. Each of these modules may communicate, directly or indirectly, with one another (e.g., via one or more buses).

UL transmission component 620 may identify that an uplink data transmission is to occur. In some cases, the uplink data transmission is a VoIP transmission.

Communication type identifier 625 may associate the uplink data transmission with a communication type, determine an identifier for decoding the downlink transmission, and determine the communication type based on the identifier. In some cases, associating the uplink data transmission with a communication type includes receiving an indicator of the communication type in an uplink grant. In some cases, associating the uplink data transmission with a communication type includes receiving a downlink transmission. In some cases, the communication type is one of a SPS communication type or a non-SPS communication type. In some cases, the communication type is associated with a link quality level.

Power control function component 630 may determine, from a plurality of configured closed-loop power control functions and based on the communication type, a closed-loop power control function to use for the uplink data transmission. Power control function component 630 may then determine, for at least one of the subframe sets, a first closed-loop power control function to use for the uplink data transmission for a first communication type in a first uplink subframe of the at least one subframe set. Subsequently, power control function component 630 may determine a second closed-loop power control function to use for the uplink data transmission for a second communication type in a second uplink subframe in the at least one subframe set. In some cases, determining the closed-loop power control function to use includes determining the closed-loop power control function on a per uplink transmission basis.

Powering component 635 may apply the closed-loop power control function to the uplink data transmission, apply power control to an additional uplink transmission based on the closed-loop power control function applied to the uplink data transmission, and apply power control to an additional uplink transmission in an uplink subframe based on a reference closed-loop power control function regardless of whether the reference closed-loop power control function is applied to the uplink data transmission in the uplink subframe. In some cases, the uplink data transmission is a SPS transmission and the additional uplink transmission is a SRS transmission.

Open loop power component 640 may determine, based on the communication type, an open-loop power control function to use for the uplink data transmission.

Power indication component 645 may receive an indication of whether to determine closed-loop power control functions based on communication type and, in some cases, disable determination of closed-loop power control functions based on the indication. In some cases, the indication is a UE-specific indication and/or a one or more subcarrier-wide indications.

Subframe configuration component 650 may receive a semi-static configuration of at least two subframe sets, each subframe set being associated with an additional closed-loop power control function. In some cases, each of the two or more subframe sets is associated with a respective interference characteristic.

Decoding component 655 may determine the communication type based on the identifier. In some cases, associating the uplink data transmission with a communication type includes determining an identifier for decoding a downlink transmission, where the identifier is one of a C-RNTI, a SPS C-RNTI, and/or the like.

Figure 7:
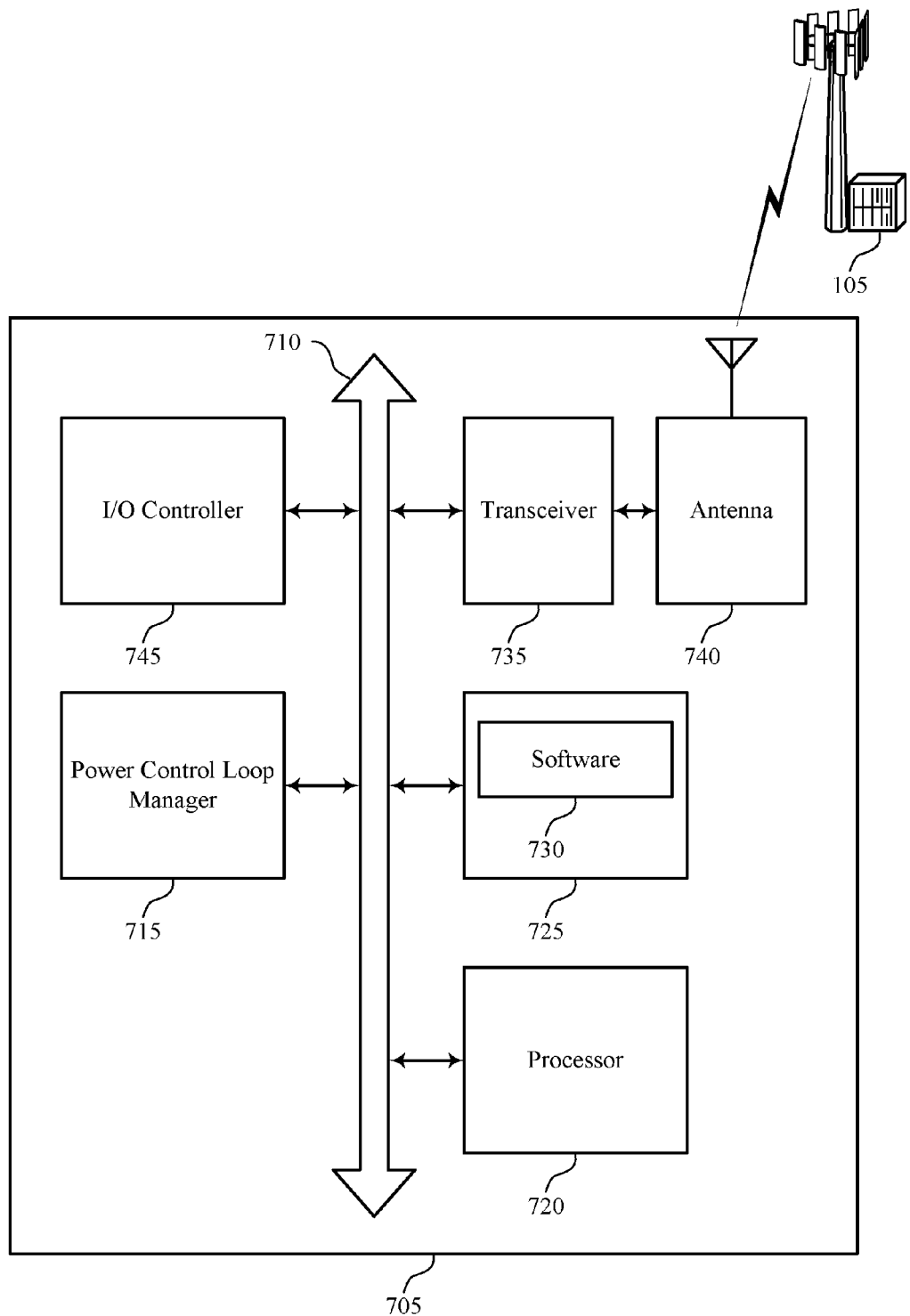
FIG. 7 illustrates a block diagram of a system including a user equipment (UE) that supports improved inner loop power control in accordance with aspects of the present disclosure.

FIG. 7 shows a diagram of a system 700 including a device 705 that supports improved inner loop power control in accordance with various aspects of the present disclosure. Device 705 may be an example of or include the components of wireless device 405, wireless device 505, or a UE 115 as described above, e.g., with reference to FIGS. 1, 4 and 5. Device 705 may include components for bi-directional voice and data communications including components for transmitting and receiving communications, including power control loop manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting improved inner loop power control) 720.

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support improved inner loop power control. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
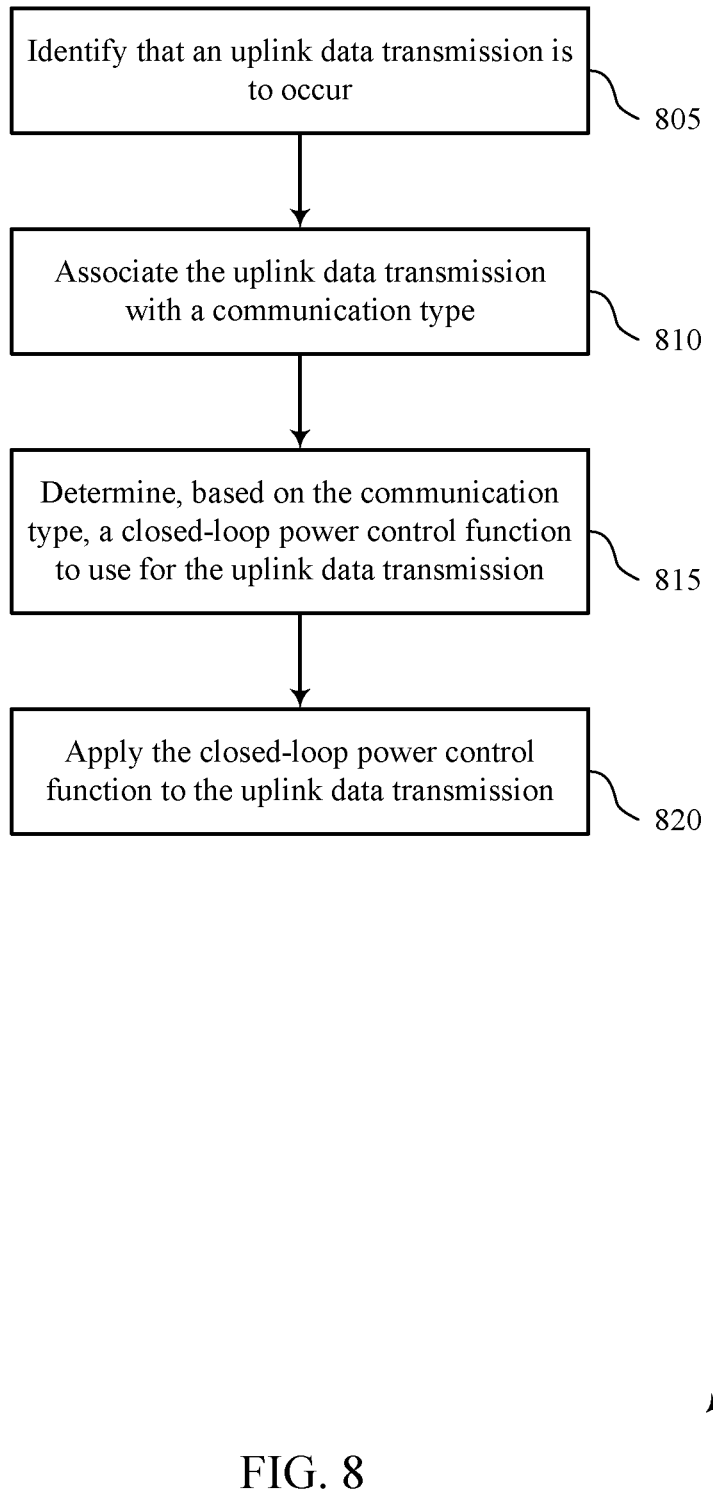
FIGS. 8 through 9 illustrate methods for improved inner loop power control in accordance with aspects of the present disclosure.

FIG. 8 shows a flowchart illustrating a method 800 for improved inner loop power control in accordance with various aspects of the present disclosure. The operations of method 800 may be implemented by a UE 115 or its components as described herein. For example, the operations of method 800 may be performed by a power control loop manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 805 the UE 115 may identify that an uplink data transmission is to occur. The operations of block 805 may be performed according to the methods described with reference to FIGS. 1 through 3. In certain examples, aspects of the operations of block 805 may be performed by a UL transmission component as described with reference to FIGS. 4 through 7.

At block 810 the UE 115 may associate the uplink data transmission with a communication type. The operations of block 810 may be performed according to the methods described with reference to FIGS. 1 through 3. In certain examples, aspects of the operations of block 810 may be performed by a communication type identifier as described with reference to FIGS. 4 through 7.

At block 815 the UE 115 may determine, from a plurality of configured closed-loop power control functions and based on the communication type, a closed-loop power control function to use for the uplink data transmission. The operations of block 815 may be performed according to the methods described with reference to FIGS. 1 through 3. In certain examples, aspects of the operations of block 815 may be performed by a power control function component as described with reference to FIGS. 4 through 7.

At block 820 the UE 115 may apply the closed-loop power control function to the uplink data transmission. The operations of block 820 may be performed according to the methods described with reference to FIGS. 1 through 3. In certain examples, aspects of the operations of block 820 may be performed by a powering component as described with reference to FIGS. 4 through 7.

Figure 9:
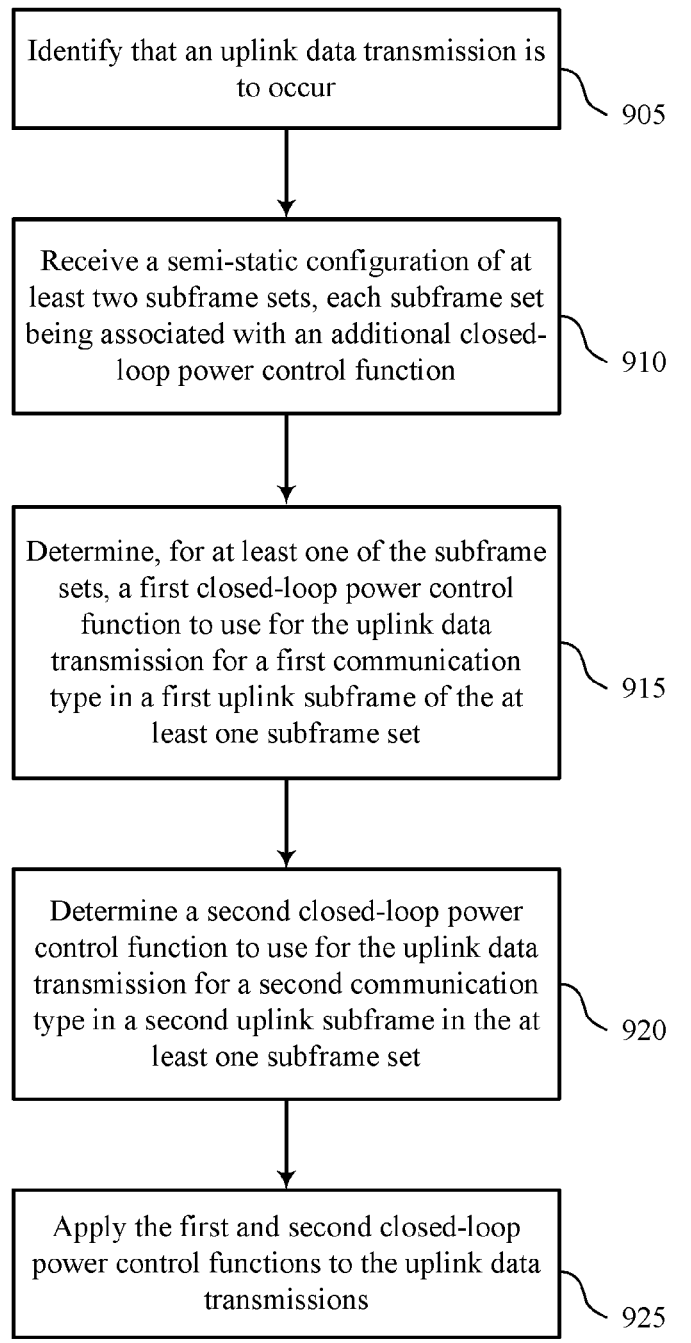

FIG. 9 shows a flowchart illustrating a method 900 for improved inner loop power control in accordance with various aspects of the present disclosure. The operations of method 900 may be implemented by a UE 115 or its components as described herein. For example, the operations of method 900 may be performed by a power control loop manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may identify that an uplink data transmission is to occur. The operations of block 905 may be performed according to the methods described with reference to FIGS. 1 through 3. In certain examples, aspects of the operations of block 905 may be performed by a UL transmission component as described with reference to FIGS. 4 through 7.

At block 910 the UE 115 may receive a semi-static configuration of at least two subframe sets, each subframe set being associated with an additional closed-loop power control function. The operations of block 910 may be performed according to the methods described with reference to FIGS. 1 through 3. In certain examples, aspects of the operations of block 910 may be performed by a subframe configuration component as described with reference to FIGS. 4 through 7.

At block 915 the UE 115 may determine, for at least one of the subframe sets, a first closed-loop power control function to use for the uplink data transmission for a first communication type in a first uplink subframe of the at least one subframe set. The operations of block 915 may be performed according to the methods described with reference to FIGS. 1 through 3. In certain examples, aspects of the operations of block 915 may be performed by a power control function component as described with reference to FIGS. 4 through 7.

At block 920 the UE 115 may determine a second closed-loop power control function to use for the uplink data transmission for a second communication type in a second uplink subframe in the at least one subframe set. The operations of block 920 may be performed according to the methods described with reference to FIGS. 1 through 3. In certain examples, aspects of the operations of block 920 may be performed by a power control function component as described with reference to FIGS. 4 through 7.

At block 925 the UE 115 may apply the first and second closed-loop power control functions to the respective uplink data transmissions. The operations of block 925 may be performed according to the methods described with reference to FIGS. 1 through 3. In certain examples, aspects of the operations of block 925 may be performed by a powering component as described with reference to FIGS. 4 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS).

3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying that an uplink data transmission is to occur over an uplink shared channel;
   associating the uplink data transmission with a communication type of the uplink shared channel, wherein the communication type of the uplink shared channel is one of a semi-persistent scheduling (SPS) communication type of the uplink shared channel or a non-SPS communication type of the uplink shared channel;
   associating a first subset of a plurality of closed-loop power control functions with one or more SPS communication types;
   associating a second subset of the plurality closed-loop power control functions with one or more non-SPS communication types;
   selecting a closed-loop power control function from the first subset of the plurality of closed-loop power control functions to use for the uplink data transmission based at least in part on the communication type of the uplink channel being an SPS communication type; and
   applying the closed-loop power control function to the uplink data transmission.

2. The method of claim 1, wherein associating the uplink data transmission with the communication type of the uplink shared channel comprises:
   receiving an indicator of the communication type of the uplink shared channel in an uplink grant.

3. The method of claim 1, wherein associating the uplink data transmission with the communication type of the uplink shared channel comprises
   receiving a downlink transmission; and
   the method further comprising:
      determining an identifier for decoding the downlink transmission; and
      determining the communication type of the uplink shared channel based on the identifier.

4. The method of claim 1, wherein selecting the closed-loop power control function to use comprises:
   selecting the closed-loop power control function on a per uplink transmission basis.

5. The method of claim 1, further comprising:
   selecting, based on the communication type of the uplink shared channel, an open-loop power control function to use for the uplink data transmission.

6. The method of claim 1, further comprising:
   receiving an indication of whether to select closed-loop power control functions based on the communication type of the uplink shared channel.

7. The method of claim 6, further comprising:
   disabling selection of closed-loop power control functions based on the indication.

8. The method of claim 6, wherein the indication is at least one of a user equipment (UE)-specific indication or a one or more subcarrier-wide indication.

9. The method of claim 1, further comprising:
   receiving a semi-static configuration of at least two subframe sets, each subframe set being associated with an additional closed-loop power control function;
   selecting, for at least one subframe set of the at least two subframe sets, a first closed-loop power control function to use for the uplink data transmission for a first communication type of the uplink shared channel in a first uplink subframe of the at least one subframe set; and
   selecting a second closed-loop power control function to use for the uplink data transmission for a second communication type of the uplink shared channel in a second uplink subframe in the at least one subframe set.

10. The method of claim 9, wherein each of the at least two subframe sets is associated with a respective interference characteristic.

11. The method of claim 1, further comprising:
    applying power control to an additional uplink transmission based at least in part on the closed-loop power control function applied to the uplink data transmission.

12. The method of claim 11, wherein the uplink data transmission is an SPS transmission and the additional uplink transmission is a sounding reference signal (SRS) transmission.

13. The method of claim 1, further comprising:
applying power control to an additional uplink transmission in an uplink subframe based at least in part on a reference closed-loop power control function regardless of whether the reference closed-loop power control function is applied to the uplink data transmission in the uplink subframe.

14. The method of claim 1, wherein associating the uplink data transmission with the communication type of the uplink shared channel comprises:
determining an identifier for decoding a downlink transmission, wherein the identifier is one of a cell radio network temporary identifier (C-RNTI) or a semi-persistent scheduling cell radio network temporary identifier (SPS C-RNTI); and
the method further comprising determining the communication type of the uplink shared channel based on the identifier.

15. The method of claim 1, wherein the communication type of the uplink shared channel is associated with a link quality level.

16. The method of claim 1, wherein the uplink data transmission is a voice over internet protocol (VoIP) transmission.

17. An apparatus for wireless communication, comprising:
means for identifying that an uplink data transmission is to occur;
means for associating the uplink data transmission with a communication type of an uplink shared channel, wherein the communication type of the uplink shared channel is one of a semi-persistent scheduling (SPS) communication type of the uplink shared channel or a non-SPS communication type of the uplink shared channel;
means for associating a first subset of a plurality of closed-loop power control functions with one or more SPS communication types;
means for associating a second subset of the plurality closed-loop power control functions with one or more non-SPS communication types;
means for selecting a closed-loop power control function from the first subset of the plurality of closed-loop power control functions to use for the uplink data transmission based at least in part on the communication type of the uplink channel being an SPS communication type; and
means for applying the closed-loop power control function to the uplink data transmission.

18. The apparatus of claim 17, wherein
the means for associating the uplink data transmission with the communication type of the uplink shared channel comprise means for receiving a downlink transmission;
the apparatus further comprising:
means for determining an identifier for decoding the downlink transmission; and
means for determining the communication type of the uplink shared channel based on the identifier.

19. The apparatus of claim 17, wherein the means for selecting the closed-loop power control function to use comprise means for selecting the closed-loop power control function on a per uplink transmission basis.

20. The apparatus of claim 17, further comprising:
means for receiving a semi-static configuration of at least two subframe sets, each subframe set being associated with an additional closed-loop power control function;
means for selecting, for at least one subframe set of the at least two subframe sets, a first closed-loop power control function to use for the uplink data transmission for a first communication type of the uplink shared channel in a first uplink subframe of the at least one subframe set; and
means for selecting a second closed-loop power control function to use for the uplink data transmission for a second communication type of the uplink shared channel in a second uplink subframe in the at least one subframe set.

21. An apparatus for wireless communication, in a system comprising:
a processor;
memory in electronic communication with the processor; and
instructions stored in the memory and operable, when executed by the processor, to cause the apparatus to:
identify that an uplink data transmission is to occur;
associate the uplink data transmission with a communication type of an uplink shared channel, wherein the communication type of the uplink shared channel is one of a semi-persistent scheduling (SPS) communication type of the uplink shared channel or a non-SPS communication type of the uplink shared channel;
associate a first subset of a plurality of closed-loop power control functions with one or more SPS communication types;
associate a second subset of the plurality closed-loop power control functions with one or more non-SPS communication types;
select a closed-loop power control function from the first subset of the plurality of closed-loop power control functions to use for the uplink data transmission based at least in part on the communication type of the uplink channel being an SPS communication type; and
apply the closed-loop power control function to the uplink data transmission.

22. The apparatus of claim 21, wherein the instructions executable by the processor to cause the apparatus to associate the uplink data transmission with the communication type of the uplink shared channel comprise instructions executable by the processor to cause the apparatus to:
receive a downlink transmission;
the instructions being further executable to determine an identifier for decoding the downlink transmission; and
determine the communication type of the uplink shared channel based on the identifier.

23. The apparatus of claim 21, wherein the instructions executable by the processor to cause the apparatus to select the closed-loop power control function to use comprise instructions executable by the processor to cause the apparatus to select the closed-loop power control function on a per uplink transmission basis.

24. The apparatus of claim 21, wherein the instructions are further executable by the processor to:
select, based on the communication type of the uplink shared channel, an open-loop power control function to use for the uplink data transmission.

25. The apparatus of claim 21, wherein the instructions are further executable by the processor to:

receive a semi-static configuration of at least two subframe sets, each subframe set being associated with an additional closed-loop power control function;

select, for at least one subframe set of the at least two subframe sets, a first closed-loop power control function to use for the uplink data transmission for a first communication type of the uplink shared channel in a first uplink subframe of the at least one subframe set; and select a second closed-loop power control function to use for the uplink data transmission for a second communication type of the uplink shared channel in a second uplink subframe in the at least one subframe set.

26. A non-transitory computer readable medium storing code for wireless communication, the code comprising one or more instructions executable by a processor to:

identify that an uplink data transmission is to occur;

associate the uplink data transmission with a communication type of an uplink shared channel, wherein the communication type of the uplink shared channel is one of a semi-persistent scheduling (SPS) communication type of the uplink shared channel or a non-SPS communication type of the uplink shared channel;

associate a first subset of a plurality of closed-loop power control functions with one or more SPS communication types;

associate a second subset of the plurality closed-loop power control functions with one or more non-SPS communication types;

select a closed-loop power control function from the first subset of the plurality of closed-loop power control functions to use for the uplink data transmission based at least in part on the communication type of the uplink channel being an SPS communication type; and apply the closed-loop power control function to the uplink data transmission.

27. The non-transitory computer-readable medium of claim 26, wherein the one or more instructions executable by the processor to associate the uplink data transmission with the communication type of the uplink shared channel comprise instructions executable by the processor to receive a downlink transmission;

the one or more instructions being further executable to:
determine an identifier for decoding the downlink transmission; and
determine the communication type of the uplink shared channel based on the identifier.

28. The non-transitory computer-readable medium of claim 26, wherein the one or more instructions executable by the processor to determine the closed-loop power control function to use comprise instructions executable by the processor to determine the closed-loop power control function on a per uplink transmission basis.

29. The non-transitory computer-readable medium of claim 26, wherein the one or more instructions are further executable by the processor to:

receive a semi-static configuration of at least two subframe sets, each subframe set being associated with an additional closed-loop power control function;

select, at least one subframe set of the at least two subframe sets, a first closed-loop power control function to use for the uplink data transmission for a first communication type of the uplink shared channel in a first uplink subframe of the at least one subframe set; and select a second closed-loop power control function to use for the uplink data transmission for a second communication type of the uplink shared channel in a second uplink subframe in the at least one subframe set.

* * * * *